June 24, 1930.   C. C. FARMER   1,765,576
HOSE COUPLING
Filed March 25, 1927

INVENTOR
CLYDE C. FARMER
BY *Wm. M. Cady*
ATTORNEY

Patented June 24, 1930

1,765,576

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

HOSE COUPLING

Application filed March 25, 1927. Serial No. 178,306.

This invention relates to hose couplings and more particularly to the type employed on railway cars, in which counterpart coupling heads are locked together upon a rotative movement of the coupling heads.

With hose couplings of the above type, a gasket is employed, having a wedge shaped flange section adapted to fit into a corresponding wedge shaped annular groove formed at the meeting face of the coupling head.

With the above type of gasket and gasket groove, there is a tendency, particularly if the groove happens to be uneven or rough, that the gasket flange will not be fitted perfectly in the groove, with the result that the gasket tends to be displaced toward the center, which sometimes results in distortion of the gasket and a restriction of the flow of fluid under pressure through the central opening in the gasket, as well as leakage from the conduit to the atmosphere through the gasket groove. When uncoupling two coupling heads, occasionally the gaskets are blown out of the coupling head, due to the action of pressure of the fluid leaking into the recess of the groove back of the gasket flange and to the pressure acting on the exposed portion of the gasket flange extending into the coupling conduit.

One object of my invention is to provide an improved gasket and groove construction to overcome the above difficulties.

Another object of my invention is to provide a hose coupling head for accomplishing the above object and at the same time adapted to interchange with the usual type of hose coupling head and in which the usual gasket may be employed when desired.

Figure 1:
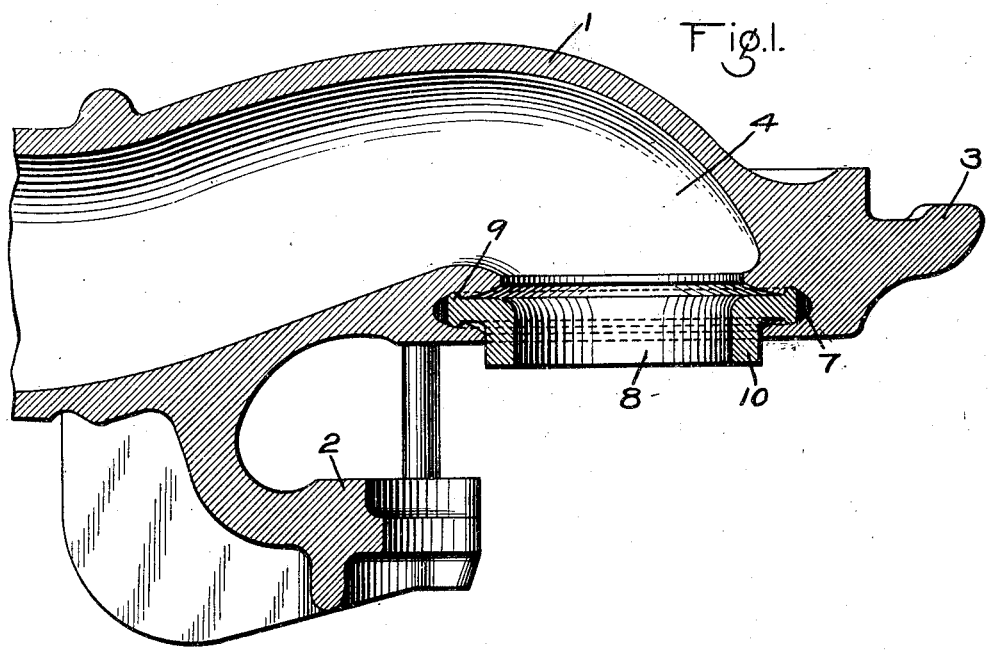
Figure 2:
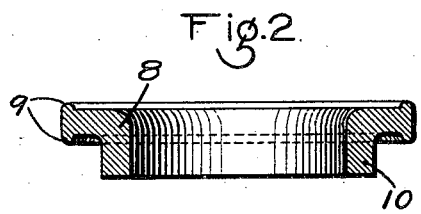
Figure 3:
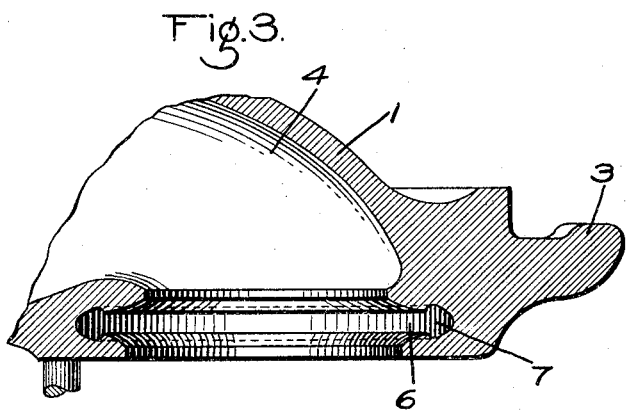

In the accompanying drawing: Fig. 1 is a sectional view of a hose coupling head and gasket constructed in accordance with my invention; Fig. 2, a sectional view of the gasket; and Fig. 3, a section of a portion of the hose coupling head with the gasket removed.

As shown in the drawing, the coupling head 1 is provided with the usual locking flanges 2 and 3 and has a fluid conduit 4, having an opening at the meeting face of the coupling head. Adjacent the opening of the fluid conduit, the coupling head is provided with an annular groove 6, the opposite sides of which are formed as arcs of circles, as in the usual hose coupling head.

According to my invention, I provide an annular, bulbous sectioned recess 7 at the rear of the gasket groove 6, such that an annular beaded gasket flange may be fitted therein.

The hose coupling gasket 8 is provided with an annular flange portion having annular beads 9, adapted to engage in the annular recess 7 and the flange portion, instead of being wedge shaped, is made with substantially parallel faces and of somewhat less thickness than the usual flange portion.

The improved hose coupling gasket 8 is applied to the coupling head 1 in the usual manner. The gasket flange is inserted in the gasket groove 6 in the coupling head and pressed back until the annular beads 9 enter the recess 7, wherein the beads expand and engage in the recess with sufficient force to form an adequate seal to prevent leakage of fluid under pressure from the conduit 4 through the gasket groove and to the atmosphere.

The beads 9 constitute a locking means to hold the gasket in place and prevents the gasket from being displaced toward the center, as is possible with the usual gasket, which is held in position by compression of the wedge shaped flange in the wedge shaped recess.

Since the beads 9 lock the gasket in position, the pressure of fluid that may leak into the recess 7 and act on the gasket, cannot cause the gasket to be blown out of the hose coupling head, when uncoupling two counterpart coupling heads.

Since the beads 9 constitute the sealing means of the gasket in the groove, the flange portion need not engage the walls of the recess and may therefore be made thinner in section than the standard gasket. Also, since the sealing area between the beads and the recess 7 is less than that between the gasket flange and sides of the groove in the standard construction, the gasket material need not be as flexible, as is the case with the usual gasket, in order to maintain a leak tight seal.

Since my improved gasket may be made of a less flexible or harder material than is used in the usual gasket, the engaging surfaces between two gaskets in counterpart coupling heads will wear longer and will better resist distortion or collapsing of the cylindrical portion 10 of the gaskets, when coupling.

The gasket groove 6 corresponds in shape to the groove in the usual hose coupling, so that the usual type of gasket, having a wedge shaped flange, may be inserted in a coupling having the bulbous recess 7 and function in the same manner as when employed in the usual hose coupling head.

Having now described my invention, what I claim as new and desire to secure by Letters Patent, is:—

1. The combination with a hose coupling head having an annular groove provided with an annular lateral recess in the wall of the groove, of a gasket of the type having a flange extending into said groove and an annular section having a face for engaging the face of a counterpart gasket, said flange having an annular bead engaging in said lateral recess.

2. The combination with a hose coupling head having an annular groove provided with annular opposed lateral recesses in the walls of the groove, of a gasket of the type having a flange extending into said groove and an annular section having a face for engaging the face of a counterpart gasket, said flange having opposed annular beads engaging in said recesses.

In testimony whereof I have hereunto set my hand.

CLYDE C. FARMER.